United States Patent [19]

Orser et al.

[11] Patent Number: 4,533,216

[45] Date of Patent: Aug. 6, 1985

[54] LIGHT VALVE PROJECTION SYSTEM WITH IMPROVED WRITING CONTROL AND REDUCED FLUID DEGRADATION

[75] Inventors: David A. Orser, North Syracuse; Jeffrey A. Bulow, Syracuse, both of N.Y.

[73] Assignee: General Electric Company, Portsmouth, Va.

[21] Appl. No.: 503,441

[22] Filed: Jun. 13, 1983

[51] Int. Cl.³ .......................... G02B 5/20; H04N 5/74
[52] U.S. Cl. ..................... 350/361; 358/62; 358/233
[58] Field of Search .............. 350/162.15, 162.12, 350/162.17, 361, 1.6, 1.7, 1.1; 358/60, 62, 231, 233

[56] References Cited

U.S. PATENT DOCUMENTS 3,247,392 4/1966 Theler ................................. 350/1.6
3,251,940 5/1966 Roussin ................................ 358/233
3,437,746 4/1969 Good et al. ........................... 358/62

Primary Examiner—Bruce Y. Arnold
Assistant Examiner—Bruce S. Shapiro

[57] ABSTRACT

A light valve projection system is disclosed in which information is impressed on a light modulating fluid (32) overlying a disk (22) wherein incident light from a lamp (10) is modulated by the information and projected onto a viewing surface (33). The fluid layer includes a raster area within which information is written by the deposition of electric charge along scanning lines so as to form diffraction gratings which are parallel to the plane of the disk. An improvement in the operation of the system is achieved by interposing a sharp-cutoff filter between the light source and the light modulating fluid. In a preferred embodiment, the sharp-cutoff filter is part of the dichroic filter plate (26). The use of the sharp-cutoff filter allows the operation of the light valve at high brightness levels while reducing attendant degradation effects of the light modulating fluid and improving the ability to control the desired writing parameters of the light valve.

8 Claims, 11 Drawing Figures

LIGHT VALVE PROJECTION SYSTEM WITH IMPROVED WRITING CONTROL AND REDUCED FLUID DEGRADATION

FIELD OF THE INVENTION

The invention pertains to the field of light projection systems employing a deformable transparent light modulating medium which diffracts incident light to form projected images in accordance with the modulating information. More particularly, the invention relates to such systems in which the light modulating medium is a fluid overlying a disk and information is written by an electron beam which scans out a raster on the fluid and forms diffraction gratings which control light rays transmitting the superimposed information. One embodiment uses orthogonally related diffraction gratings to permit projection of full color information. Systems of this type are commonly termed light valve projection systems.

BACKGROUND OF THE INVENTION

Light valve projection systems have been in commercial use for many years and are capable of providing good performance. Over the years, a number of improvements have been made to enhance the performance of these systems. One such improvement is described in U.S. Pat. No. 4,283,120 issued to David A. Orser et al and assigned to the assignee of this application. One problem solved by the invention described in the patent was termed "burn-in" which produces a moire pattern of color, predominantly green, appearing within the projected picture. This problem is avoided by mounting a rotatable disk within the light valve housing so that its lower portion is immersed in a sump which holds the light modulating fluid causing the fluid to cover over at least one surface of the disk during the rotation of the disk. The raster is positioned on the disk offset from the coordinate axes with the origin at the disc center so that the movement of the fluid responsive to the disk rotation is along paths that intersect the diffraction gratings obliquely over the entire raster. Burn-in is eliminated because fluid motion never becomes tangential to either grating axis.

Recently, it has been observed that the viscosity of the fluid control layer in light valves operated with projected light flux densities greater than about 280 modulated lumens for color light valves and greater than about 750 modulated lumens for black and white light valves is more difficult to control than in those operated at lower light flus densities. In addition, light valve post mortem analyses of fluid related parameters show that a higher brightness condition is more severe than a standard brightness condition with regard to fluid degradation. The post mortem analyses on fluid, sorbents and disks from a variety of light valve types operated in the field and those on life test at higher brightness levels indicate accelerated degradation with respect to fluid related parameters. Life test data also show earlier failure for light valves operated at high brightness. Black and white light valves with higher light flux densities than color light valves have also been shown to exhibit similar accelerated degradation. One consequence of the current trend to higher brightness is that many light valve components including but not limited to the input window and lenticular lens are subjected to greater stress, induced primarily by increased temperatures and/or temperature gradients resulting from the higher light flux through the system.

SUMMARY OF THE INVENTION

It is therefore an object of the invention to provide an improvement in light valve projection systems which allows their operation at higher brightness while reducing the fluid degradation effects which have been observed in such systems.

It is another object of the present invention to improve the control of deformable fluid writing parameters of light valve projection systems when operated at high brightness.

It is a further and more particular object of the invention to reduce the energy incident on the fluid in the raster area of a light valve projection system thereby allowing better control of writing parameters and increased light valve operating life.

Briefly stated, the foregoing objects are accomplished in light valves by eliminating or drastically reducing the energy input to the raster area in the wavelength range below approximately 440 nanometers (nm). This reduction in energy input can be achieved by using a sharp-cutoff filter. The "sharp-cutoff" in our application means a high pass optical filter in wavelength domain where below a specified wavelength, the transmittivity is near zero % over a desirable range of the electromagnetic spectrum and near 100% over the range of the electromagnetic spectrum which will be used for information imaging with the transition from near zero % to near 100% transmission being, in the preferred embodiment, monotonic and defined by a steep positive going slope which may be translated in or along the wavelength axis to produce the desired response consistent with the application. For the preferred embodiment, this is L42 glass (Hoya Glass Co.) with about 50% transmissivity at 420 nm. The sharp-cutoff filter may be part of a color filter plate or it may be located anywhere between the light source for projection and the light modulating medium. In the disclosed preferred embodiment, the sharp-cutoff filter is part of the dichroic filter itself. More specifically, the dichroic filter is made by coating a substrate having the desired cutoff characteristic. The transmissivity of the sharp-cutoff filter in the preferred embodiment is approximately 50% at 420 nm. The important thing is that by removing most of the energy in the raster area in the wavelength range below that needed to provide proper colorimetry (typically, but not limited to the range of approximately 420 nm to 700 nm), the desired control of the deformable fluid layer may be more easily achieved. In particular, the control parameters of interest are the Green Cancellation Ratio (GCR) at the center of the raster and the uniformity of the GCR within the raster. In addition, this reduction in incident energy results in a significant decrease in writing fluid degradation contributing to increased light valve operating life. The invention is useful for light valves using any fluid exhibiting UV, visible or IR absorption characteristics and in particular fluids of the type disclosed in U.S. Pat. No. 3,288,927 issued to Ralph E. Plump, U.S. Pat. No. 3,317,664 and No. 3,317,665 issued to Edward F. Perlowski, Jr., U.S. Pat. No. 3,541,992 issued to Carlyle S. Herrick et al, and U.S. Pat. No. 3,761,616 issued to C. E. Timberlake. These fluids may include additives as taught by U.S. Pat. No. 3,764,549 and No. 3,928,394 issued to David A. Orser.

BRIEF DESCRIPTION OF THE DRAWINGS

While the specification concludes with the claims which particularly point out a distinctly claim that subject matter which is regarded as inventive, it is believed the invention will be more clearly understood when considering the following detailed description taken in connection with the accompanying figures of the drawings, in which:

DESCRIPTION OF A PREFERRED EMBODIMENT

Figure 1:
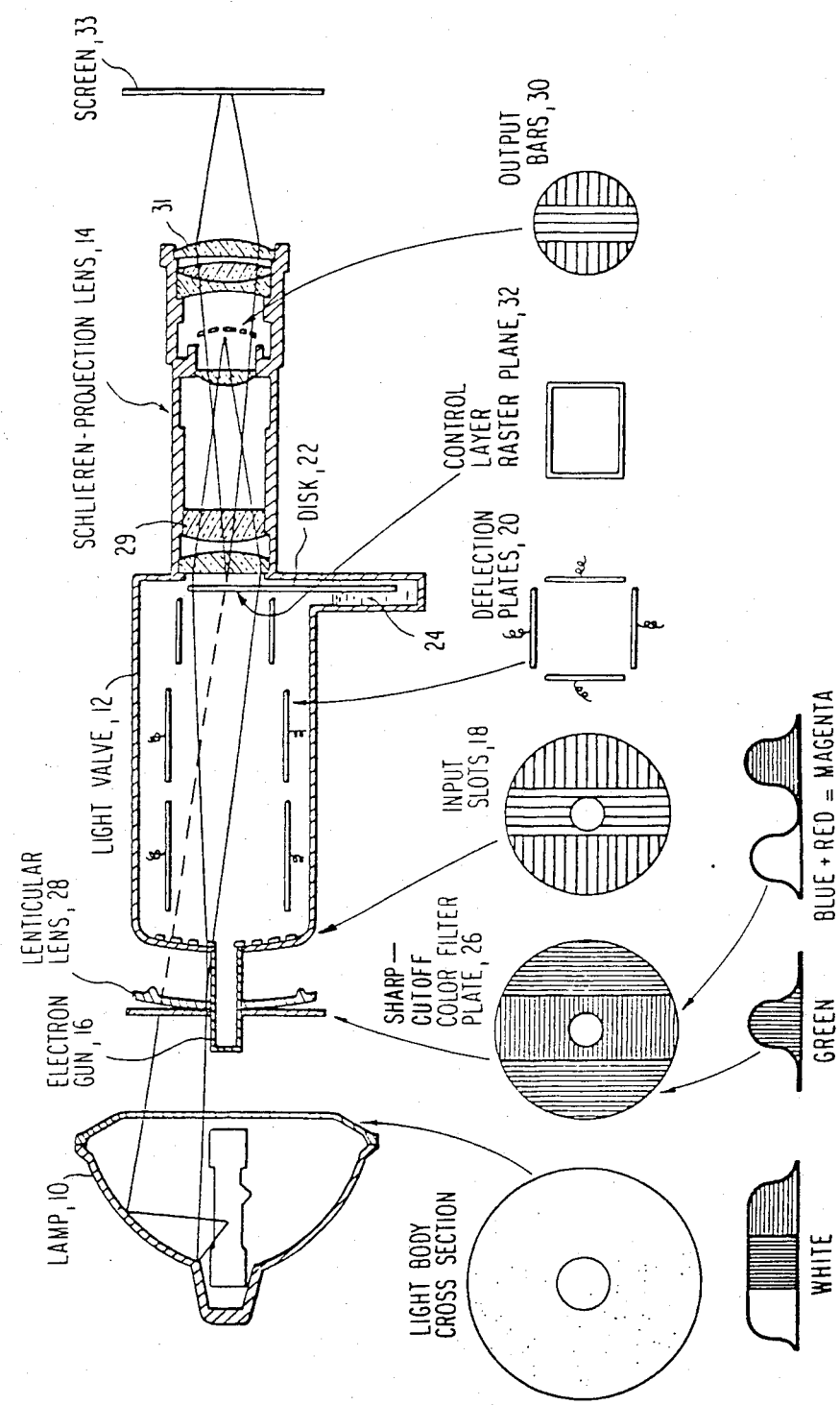
FIG. 1 is a schematic diagram showing the principal parts of a single gun color television light valve system.
Figure 2:
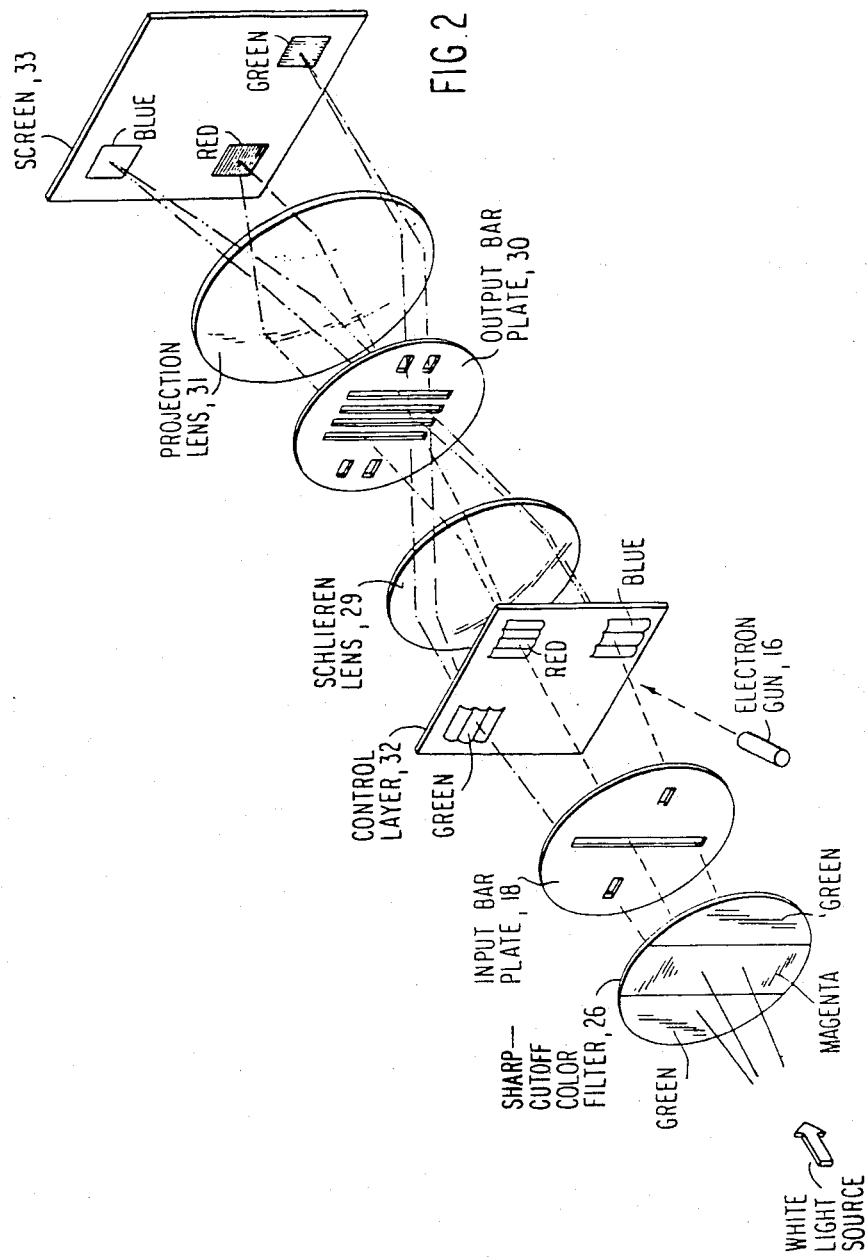
FIG. 2 is a simplified diagram of the light valve system shown in FIG. 1 illustrating the color selection action of the three basic gratings.

Referring to FIG. 1, there is schematically shown a single-gun color television light valve assembly comprising a xenon lamp 10, sealed light valve 12, and schlieren projection lens 14. The sealed light valve 12 contains the electron gun 16, input slots 18, deflection plates 20, the fluid control layer on the rotating disk 22, and the fluid reservoir 24. The light from the lamp 10 is projected through a sharp-cutoff color filter plate 26 and a lenticular lens 28 before entering the light valve 12. The schlieren projection lens 14 includes a schlieren lens 29, output color selection bars 30 and a projection lens 31. The lower half of the figure shows the cross sections of the light valve system. The simplistic spectral diagrams at the bottom indicate how the light is prefiltered before entering the light valve. FIG. 2 is a simplified light valve diagram showing the color selection action of the three basic gratings. In FIG. 2, the control layer 32 which is supported by the rotating disk 22 (shown in FIG. 1) is illustrated as having three diffraction gratings, one each to select red, green or blue light. These diffraction gratings may be written individually or simultaneously and are normally actually superimposed, but for the purposes of illustration only, they are shown in FIG. 2 as separated on the control layer 32.

In the light valve projection system shown in FIGS. 1 and 2, green light is passed through the horizontal slots of the input bar plate 18 and is controlled by modulating the width of the raster lines on the control layer 32. This is done by means of a high frequency carrier applied to the vertical deflection plates and modulated by the green video signal. Magenta (red and blue) light is passed through the vertical bar slots of the input bar plate 18 and is modulated by diffraction gratings created at right angles to the raster lines by velocity modulating the electron spot in the horizontal direction. In one embodiment, this is done by applying a 16 MHz (12 MHz for blue) signal to the horizontal deflection plates and modulating it with the red video signal. The grooves created in the control layer 32 have the proper spacing to diffract the red portion of the spectrum through the output slots in plate 30 while the blue portion is blocked. For the 12 MHz carrier, the blue light is passed by the slots in the plate 30 and the red is blocked. Thus, three simultaneous and superimposed primary color pictures are written with the same electron beam and projected to the screen 33 as a completely registered full color picture. Colors are created by writing diffraction gratings within each picture element on the fluid surface by manipulating the single scanning electron beam. These gratings diffract the transmitted light into its spectral components which appear at the output bars where they are spatially filtered to let the desired color reach the screen. This technique permits a full color television picture to be written on a single control layer with no need for further registration. The principles of operation just described apply to a black and white or single color light valve projection system, the difference being that only white light or a single color is projected. If the color chosen to be projected were green, for example, the plates 18 and 30 might have only horizontal slots and bars, respectively, and only a single set of diffraction gratings would be written on the fluid control layer 32. Other color choices for a monochrome light valve projection system would require similar modifications with the spacings between the slots and bars and the frequency of the carrier being selected for the color chosen.

Figure 3:
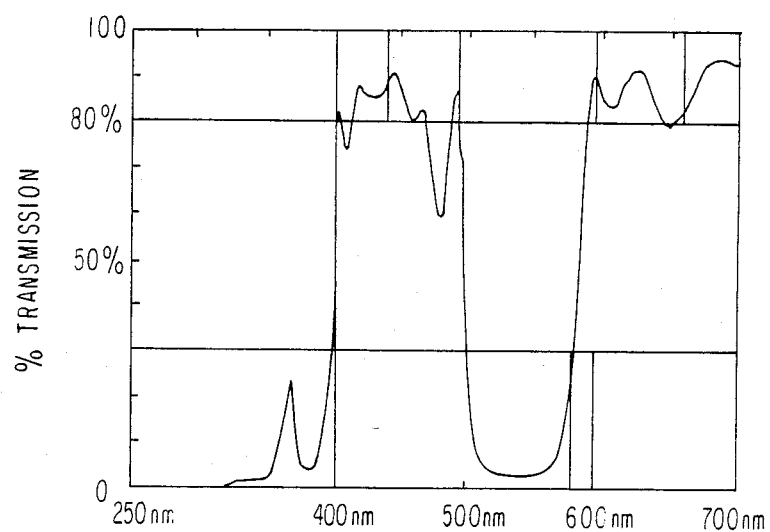
FIG. 3 is a graph showing the pass characteristic of a prior art magenta dichroic filter.
Figure 4:
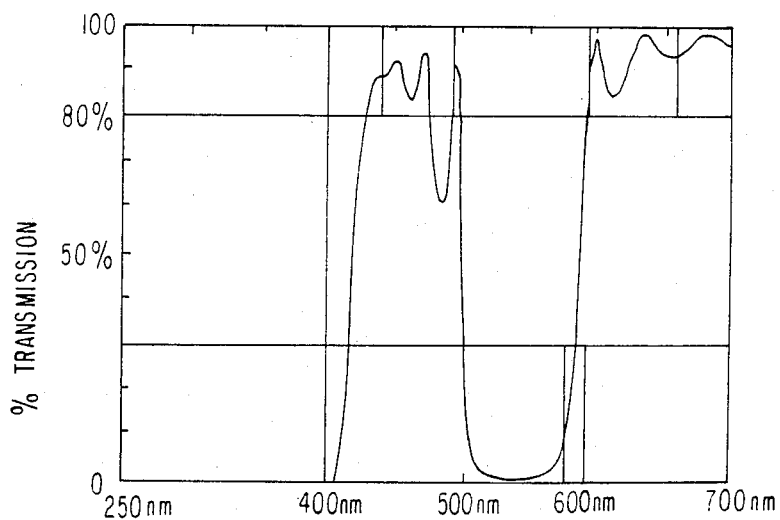
FIG. 4 is a graph showing the pass characteristic of a magenta dichroic filter made on a sharp cutoff substrate according to the invention.
Figure 5:
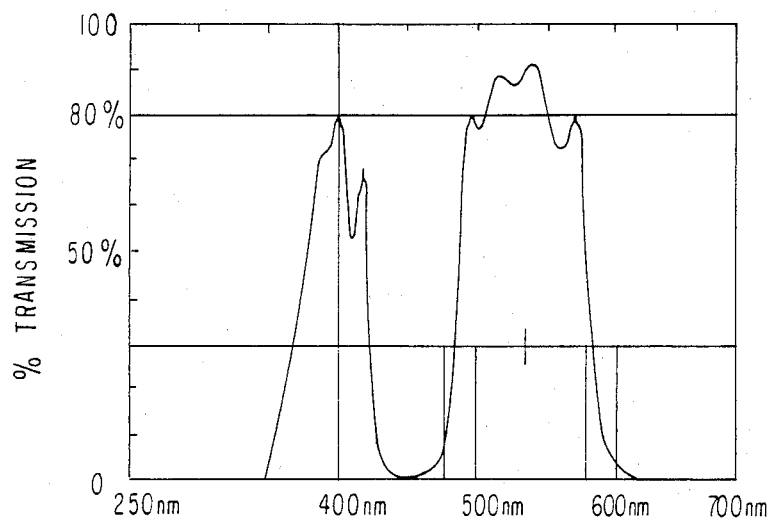
FIG. 5 is a graph showing the pass characteristic of a prior art green dichroic filter.
Figure 6:
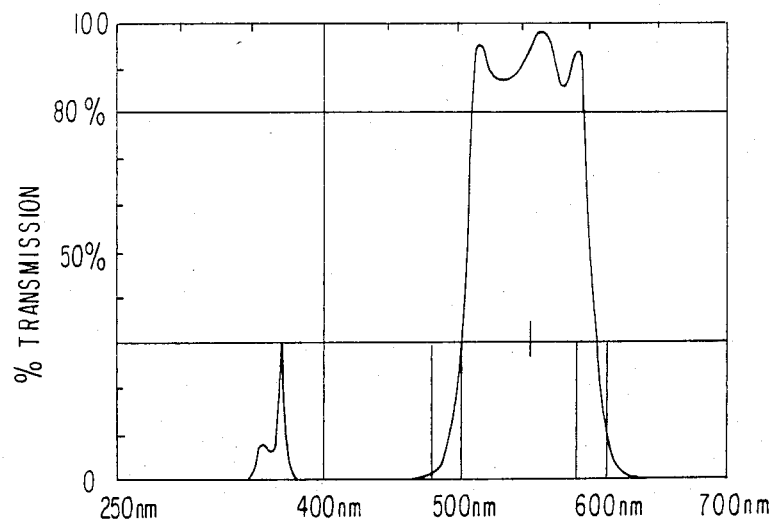
FIG. 6 is a graph showing the pass characteristic of an improved prior art green dichroic filter.
Figure 7:
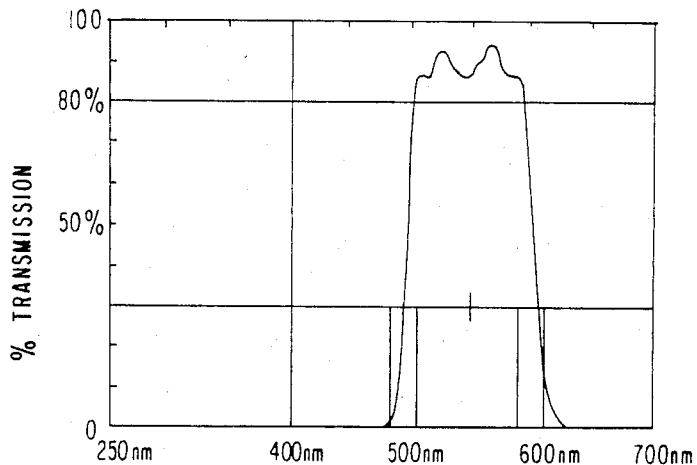
FIG. 7 is a graph showing the pass characteristic of a green dichroic filter made on a sharp-cutoff substrate according to the invention.

FIG. 3 is a graph showing the pass characteristic of a typical magneta dichroic filter on a normal substrate that is conventionally used in place of the sharp-cutoff color filter plate 26 shown in FIG. 1. Some light passing through this filter with λ less than about 420 nm is absorbed by the fluid comprising the control layer causing its temperature to rise and increasing temperature gradients within the raster. Therefore, it is desirable to reduce the intensity of such light to achieve the desired operating temperature and temperature uniformity of the control layer. FIG. 4 is a graph showing the pass characteristic of a magenta dichroic filter on a sharp-cutoff substrate according to the present invention. The sharp-cutoff filter reduces the average percentage of light transmitted, over the range of 250 nm to 410 nm, from about 9% to about 0.1%. It is possible to significantly reduce the average percentage of light transmitted through the green filter without the use of a sharp-cutoff substrate. FIG. 5 is a graph showing a green filter pass characteristic having an average percentage of light transmitted over the range of 250 nm to 410 nm of approximately 18.7%. Without using the sharp-cutoff substrate, it is possible to produce a green filter having the pass characteristic shown in FIG. 6. This filter has an average percentage of light transmitted over the range of 250 nm to 410 nm of approximately 1.6%; however, by using a sharp-cutoff substrate, a filter having the pass characteristic shown in FIG. 7 is obtained. This filter has an average percentage of light transmitted over the range of 250 nm to 410 nm of about 0.01% without affecting the desired transmission characteristic.

Figure 8:
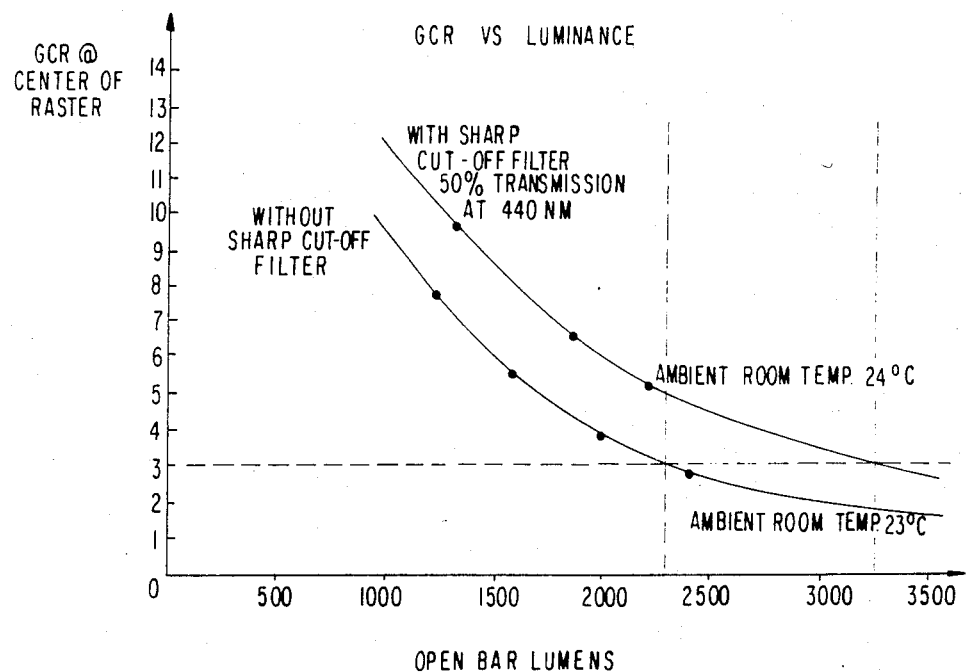
FIG. 8 is a graph showing a comparison of green cancellation ratio (GCR) values plotted against lumens for the case of a light valve using the sharp-cutoff filter according to the invention and a light valve without the sharp-cutoff filter.

The advantage of using filters having sharp-cutoff characteristics is illustrated by the graph of FIG. 8 which clearly shows the effect of a sharp-cutoff filter on the GCR for various light flux densities. The GCR is a measurement of the ratio of the depths or slopes of the grooves at a known spatial frequency or pitch of the given diffraction gratings produced for the conditions of paired scanning of the electron beam and interlaced scanning of the electron beam, and since the measurement is made only for a flat field of green light, it is referred to as the green cancellation ratio. Paired scanning is the procedure of scanning the same lines each field, whereas interlaced scanning is the procedure of scanning alternate lines each field. The former has the effect of generating deeper grooves and hence passing more light, all other conditions being equal. The depth of the grooves is also a function of fluid viscosity which in turn is an approximate function of the fourth power of the temperature of the fluid. Therefore, the GCR is a sensitive indicator of the relative temperature of the fluid, all other conditions remaining constant. Thus, it will be seen in FIG. 8 that as the light flux measured in lumens through the light valve increases, the GCR drops off indicating a decrease in viscosity of the fluid and a corresponding increase in the temperature of the fluid. The actual measurement of the GCR was made with a Tektronix J16 luminance probe light meter mounted in the center of screen 33 shown in FIG. 1. Each measurement was made after the valve was operated at a given light flux density for a period of time sufficient to obtain a stable fluid layer temperature. Using the GCR as an indicator of relative fluid temperature, the data developed and graphed in FIG. 8 shows that for every light level, the temperature of the fluid is greater without the sharp-cutoff filter than with the sharp-cutoff filter. It can also be seen that for a given GCR, a higher light flux density can be projected by using a sharp-cutoff filter. It is of course recognized that there are parameters other than temperature such as fluid depth and fluid charge mobility which affect the value of the GCR, but it is possible to separate out the effects of temperature change from these other parameters sufficiently well enough to analyze the data and find a significant trend of behavior of the fluid with temperature in an operating light valve via GCR values. This was done knowing that due to absorption of spectral energy by certain components of the light valve, the temperature of these components, specifically the disc-fluid writing area, will vary with light intensity. Based on these assumptions, the plot of GCR values against luminance values in FIG. 8 is an indicator of raster temperature, in relative units, and a direct measure of writing efficiency. The higher value of GCR for equal light flux levels indicates a cooler raster temperature when the incident light is filtered by a sharp-cutoff filter, or an equal value of GCR for higher light flux density indicates an equivalent raster temperature when the incident light is filtered by a sharp-cutoff filter.

In a preferred embodiment of the invention, the substrates having the sharp-cutoff characteristic are L-42 glass produced by Hoya Glass Co.; however, glass having a similar sharp-cutoff characteristic is available from other manufacturers such as the Corning Glass Co. Glass exhibiting the desired sharp-cutoff characteristic is typically a metal salt impregnated glass. The metal salt creates an absorption quality in the glass in the wavelengths of interest. The glass is cut to size and a dichroic coating is applied to the substrate. Specific examples of dichroic filter coatings on the Hoya L-42 sharp cutoff substrate produce filters having the pass characteristics shown in FIGS. 4 and 7.

Figure 9:
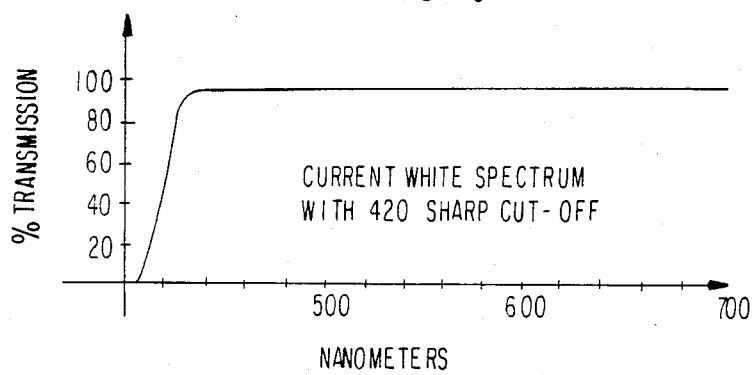
FIG. 9 is a graph showing the typical spectral response to an equal intensity light source of a sharp-cutoff filter suitable for use in full color light valves.
Figure 10:
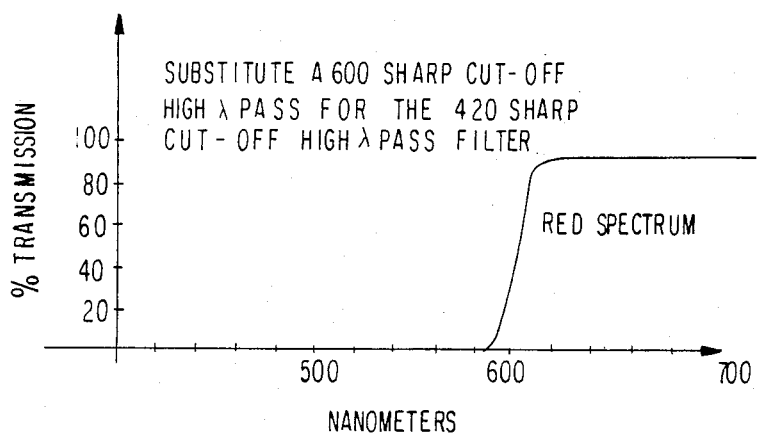
FIG. 10 is a graph showing a filtered red spectral response to an equal intensity light source of a sharp-cutoff filter suitable for use in red monochrome light valves made according to the teachings of the invention.
Figure 11:
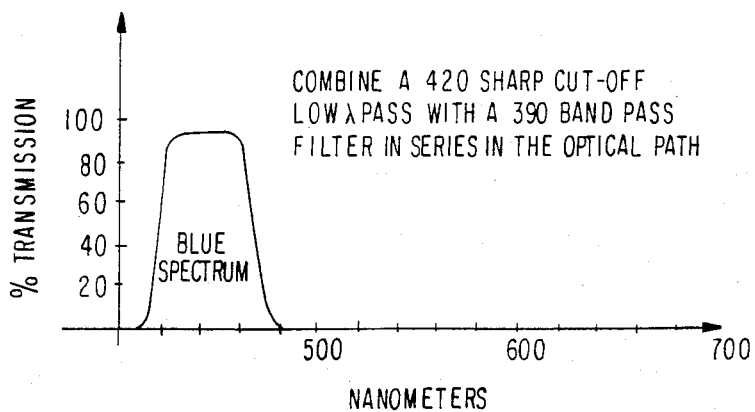
FIG. 11 is a graph showing a filtered blue spectral response to an equal intensity light source of a bandpass and a sharp-cutoff filter for blue monochrome light valves made according to the teachings of the invention.

As previously mentioned, the invention can also be applied to black and white and monochrome light valves as well as color light valves. The green monochrome light valve has already been mentioned in connection with the description of FIGS. 1 and 2. The improvement afforded by the invention is not as great if a dichroic filter having the pass characteristic shown in FIG. 6 is used as opposed to that of FIG. 6. Nevertheless, there is a measurable improvement when using a filter having the pass characteristic shown in FIG. 7 according to the invention. FIG. 9 is a graph showing the typical spectral response of a sharp-cutoff filter suitable for use in red-green-blue or full spectrum light valves currently being manufactured. These are color light valves capable of projecting any one of the three colors or any combination of the three. For those applications where a single color light valve is desirable, spectral response filtering will boost the brightness-temperature efficiency significantly. FIG. 10 is a graph showing a filtered red spectrum using a 600 nm sharp-cutoff filter. This filter could be used in place of the 420 nm sharp cutoff filter in a red light valve. In such a light valve, the dichroic filters may no longer be necessary and omitting them could improve the brightness of the light valve. A blue light valve might employ a filtered blue spectrum as shown in the graph of FIG. 11. This might be accomplished by using the 420 nm sharp-cutoff filter in series with a 390 nm band pass filter which cuts off at approximately 290 nm and at 500 nm. By putting this in series with a 420 nm sharp-cutoff filter, the resulting band pass is between 420 nm and 490 nm, about 50%T at each of these wavelengths.

Whether the teachings of the invention are applied to color light valves, monochrome light valves or black and white light valves for equal projected light flux densities, the advantages of drastically reducing the energy input to the raster area for wavelength values below approximately 440 nm are a desireably lower fluid control layer temperature and reduced degradation of the fluid. The lower temperature also improves the control of writing parameters of light valve projecting systems when operated at high brightness. The invention has been described and illustrated in connection with specific preferred embodiments, and those skilled in the art will readily recognize that modifications can be made to those embodiments without departing from the spirit of the invention. For example, a color light valve can be made in which sharp-cutoff color filter plate 26 (shown in FIG. 1) has a different combination of filters than green and magenta. Moreover, light valves which will benefit from the invention are not limited to those operating in the visible spectrum. There are in fact applications in which infrared light valves are used. In such light valves, the sharp-cutoff filter might advantageously be chosen to eliminate the visible light as well as the ultraviolet light. The important thing is that the energy input to the raster area below wavelengths needed for good colorimetry be drastically reduced.

We claim:

1. An improved light valve comprising:
   a light modulating fluid;
   a light source positioned to project light through said light modulating fluid;
   electron beam means for scanning an electron beam to form a raster, wherein there is formed within said raster at least one diffraction grating in said light modulating fluid to diffract incident light from said light source for projection onto a viewing surface,
   said electron beam means including vertical and horizontal deflection means for controlling the position of said electron beam and means for depositing charge to control depth and spacing of grooves in said diffraction grating thereby controlling the diffraction of said incident light, and
   a sharp-cutoff filter positioned between said light source and said light modulating fluid, said sharp-cutoff filter being an optical filer having characteristics where below a specified wavelength the transmissivity is near zero percent over a desirable range of the electromagnetic spectrum, including at least that part of the ultraviolet spectrum responsible for deleterious effects on the light modulating fluid, and near 100% over a range of the electromagnetic spectrum which is used for information imaging with the transition from near zero percent to near 100% transmission being defined by a steep positive going slope, said sharp-cutoff filter allowing the operation of the light valve at high brightness levels while reducing attendant degradation effects of said light modulating fluid and maintaining desired writing parameters of the light valve by decreasing the temperature of said light modulating fluid for said high brightness levels.

2. The improved light valve according to claim 1 wherein said light valve is a color light valve and said electron beam means forms a raster of orthogonally related diffraction gratings on said light modulating fluid to diffract incident light into different spectral colors, said light valve further including a dichroic filter plate between said light source and said light modulating fluid.

3. The improved light valve according to claim 2 wherein said sharp-cutoff filter is part of said dichroic filter plate.

4. The improved light valve according to claim 3 wherein said dichroic filter plate is a dichroic coating on a substrate having a sharp-cutoff characteristic.

5. The improved light valve according to claim 1 wherein said light valve is a black and white light valve.

6. The improved light valve according to claim 1 wherein said light valve is a red monochrome light valve and said sharp-cutoff filter has a 50% transmission cutoff at about 600 nm.

7. The improved light valve according to claim 1 wherein said light valve is a blue monochrome light valve and said sharp-cutoff filter is a bandpass filter having a pass band of approximately 420 nm to 490 nm.

8. In a light valve which includes electron beam means for scanning an electron beam to form a raster, wherein there is formed in said raster at least one diffraction grating in a light modulating fluid to diffract incident light from a light source for projection onto a viewing surface, said electron beam means including vertical and horizontal deflection means for controlling the position of said electron beam and means for depositing charge to control depth and spacing of grooves in said diffraction grating thereby controlling the diffraction of said incident light, an improvement for allowing the operation of the light valve at desired writing parameters by maintaining a desired operating temperature while reducing attendent degradation effects of said modulating fluid at increased brightness levels, said improvement comprising:
   a sharp-cutoff filter positioned between said light source and said light modulating fluid, said sharp-cutoff filter being an optical filter having characteristics where below a specified wavelength the transmissivity is near zero percent over a desirable range of the electromagnetic spectrum, including at least that part of the ultraviolet spectrum responsible for deleterious effects on the light modulating fluid and near 100% over a range of the electromagnetic spectrum which is used for information imaging with the transition from near zero percent to near 100% transmission being defined by a steep positive going slope.

* * * * *